United States Patent [19]

Carter et al.

[11] 4,110,495
[45] Aug. 29, 1978

[54] IMPROVEMENTS IN SHOE MANUFACTURE

[75] Inventors: Alan Reginald Carter, Kettering; Donald Pettit, Isham, both of England; Josephus Sychbertus Langerwerf, Waalwijk, Netherlands

[73] Assignee: The Shoe and Allied Trades Research Association, Kettering, Great Britain

[21] Appl. No.: 722,692

[22] Filed: Sep. 13, 1976

[30] Foreign Application Priority Data

Sep. 16, 1975 [GB] United Kingdom ............ 38084/75

[51] Int. Cl.² .............................................. B05D 5/00
[52] U.S. Cl. .................................... 427/400; 106/311; 427/322; 427/444
[58] Field of Search ...................... 427/400, 444, 322; 106/311; 428/492, 425, 521, 523, 353; 156/308

[56] References Cited

U.S. PATENT DOCUMENTS

| | | | |
|---|---|---|---|
| 3,326,742 | 6/1967 | Shepherd | 427/322 |
| 3,862,883 | 1/1975 | Cantor | 428/521 |
| 3,968,316 | 7/1976 | Jyo et al. | 427/400 |
| 3,991,255 | 11/1976 | Blaskiewicz et al. | 427/400 |

FOREIGN PATENT DOCUMENTS

| | | | |
|---|---|---|---|
| 1,352,645 | 5/1974 | United Kingdom. | |
| 1,293,842 | 10/1972 | United Kingdom. | |
| 1,295,677 | 11/1972 | United Kingdom. | |
| 1,405,257 | 9/1975 | United Kingdom | 156/308 |

*Primary Examiner*—Ronald H. Smith
*Assistant Examiner*—Sadie L. Childs
*Attorney, Agent, or Firm*—Lerner, David, Littenberg & Samuel

[57] ABSTRACT

A composition and method for the pre-treatment of rubber surfaces prior to application of adhesive, the composition comprising a halogen substituted isocyanuric acid (preferably trichloroisocyanuric acid) and a non-halogenated sulphonamide (preferably paratoluenesulphonamide).

9 Claims, No Drawings

IMPROVEMENTS IN SHOE MANUFACTURE

The present invention relates to the adhesion of elastomeric materials, and in particular to the attachment of shoe sole material to shoe upper material such as leather.

It is known that the receptiveness of elastomeric soling material towards adhesives e.g. of the polychloroprene and polyurethane types is often unsatisfactory. In order to improve adhesion, British Patent specification No. 1,278,258 describes and claims the subjection of a sole unit of elastomeric soling material to a surface halogenation treatment prior to the application of the adhesive. The preferred treatment described consists of dipping the material to be treated in an acidified sodium hypochlorite solution. Such solutions are subject to the disadvantage that the chlorine generated presents a hazard in shoe factories.

British Patent specification No. 1,295,677 and British Patent specification No. 1,293,842 describe the use of an organic halogenation donor instead of acidified hypochlorite. The halogenation donors proposed are in general chlorine donors such as trichloroisocyanuric acid, but the use of dibromodimethylhydantoin (DBH) is also described. The treatment in general consists of wiping or dipping the elastomeric sole material in a solution containing the halogenation donor after which the sole is dried and can be stored prior to attachment to the shoe upper. A sole may be pre-cemented after such a treatment and subsequently heat activated before securement.

The chlorine donors liberate chlorine slowly and this process is accelerated when heat and pressure are applied during the adhesion of the sole to the shoe. They have the advantage that they are safe to handle in solution and do not liberate chlorine in the quantities found in inorganic hypochlorite solutions when exposed in open dishes.

British Patent specification No. 1,352,645 describes the use as an organic chlorine donor of an acidified solution of an N-halogen sulphonamide e.g. having the general formula:

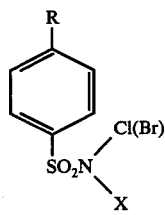

in which R may be H or $CH_3$ and X may be H or Cl or Br.

The preferred halogenating agent is obtained by acidification of chloramine-T which is the sodium salt of N-chloroparatoluenesulphonamide, and the acidified solution is relatively unstable.

Some of the more difficult soling materials to adhere are compounds based on thermoplastic rubbers. These materials are essentially styrene-butadiene copolymers. We have found that such thermoplastic rubbers containing low levels of polybutadiene are difficult to adhere following pretreatment with an organic halogen donor based upon trichloroisocyanuric acid. Adhesion in this case can be improved through the use of an organic halogen donor based upon an N-halogen sulphonamide. Unexpectedly, however, when the polybutadiene content is high, the phenomenon is reversed and better results can be obtained with trichloroisocyanuric acid. These results imply that in practice a different halogenating agent may be necessary for treating different thermoplastic rubbers, which is not a satisfactory situation, particularly having regard to the difficulty of preparation of halogenating agents of the N-halogen sulphonamide type.

We have now also found that good results can be obtained in the adhesion of thermoplastic rubbers based upon styrene-butadiene, over a wide spectrum of polybutadiene contents, by using as a halogenating agent a solution containing a halogen substituted isocyanuric acid and a non-halogenated sulphonamide. As used herein, the term "non-halogenated sulfonamide" is intended to refer to sulfonamide compounds in which the nitrogen atom is free from a halogen, i.e., non N-halogenated sulfonamides. Good results can, of course, be obtained with other rubber soling materials.

Some further improvement can be obtained if the solution also contains (preferably in a relatively smaller proportion) an aromatic sulphonic acid. This is particularly beneficial applied to thermoplastic rubber having a very low polybutadiene content. Such rubbers are at the present time not commercial soling rubbers.

A preferred halogen donor is trichloroisocyanuric acid, although dichloroisocyanuric acid is also suitable. The preferred sulphonamide is paratoluenesulphonamide. The preferred sulphonic acid is paratoluenesulphonic acid.

Various solvents may be used but a particularly useful solvent is a 1:1 by volume mixture of 111 trichloroethane and tertiary butyl alcohol. Another useful solvent is a 1:1:1 mixture of 111 trichloroethane, tertiary butyl alcohol, and toluene.

It is believed that the chlorinated isocyanuric acid, which is preferably highly halogenated, partially converts the non-halogenated sulphonamide to the chlorinated N-halogen sulphonamide.

Solutions of the two or three components mentioned have been found to be stable in the described solvents.

At least the preferred solution appears to be stable, in the absence of the sulphonic acid, for a year or more. The stability is somewhat reduced by addition of the sulphonic acid.

The preferred formulation is as follows:

2% wt/vol trichloroisocyanuric acid,
1.5% wt/vol paratoluenesulphonamide,
(0.8% wt/vol paratoluenesulphonic acid, if desired).

Either of the solvents above mentioned may be used. In general the N-chloroisocyanuric acid component may vary between 1 to 10% and the sulphonamide similarly, although a smaller amount of sulphonamide, relative to the N-chloroisocyanuric acid, is preferably used. A smaller amount again of the sulphonic acid is preferably used, if at all.

EXAMPLE

The original surfaces of Shell thermoplastic rubbers TOB 955; TOB 962 and TOB 964, were wiped with a solution containing 2% wt/vol trichloroisocyanuric acid plus 1.5% wt/vol paratoluenesulphonamide in equal parts of 111 trichloroethane and tertiary butyl alcohol. The wiped surfaces were left for 15 minutes and then coated with a polyurethane adhesive Evo-Stik (Trade Mark) 8628 (Vik Supplies Limited) and left for 24 hours open time.

The adhesive on the rubber was heat reactivated to 85° C and bonded to a PVC coated fabric upper material (trade mark Blakes 47 thou patent PVC on SDI) which had been treated as follows:

MEK wiped and left for 15 minutes before coating with Evo-Stik 8628 and then left for 1 hour open time prior to bonding.

The bonding was performed by pressing the soling material and upper material together for 15 seconds at a pressure of 5.6 kgf/cm$^2$.

The results appear in the following Table.

TABLE

| Soling compound | Bond strength kgf/cm | Type of Failure |
| --- | --- | --- |
| TOB 955 | 8.0 | 75R 25SR |
| TOB 962 | 13.0 | 15R 85SR |
| TOB 964 | 12.5 | 100R.Tore |

Key:
R - rubber failure
SR - surface rubber failure
R.tore - rubber tore

Aspects of the invention include the pretreatment reagent per se, the method of pre-treating rubber, especially thermoplastic rubber, and the pre-treatment when used in the manufacture of footwear, together with the resulting products.

In mixing the components of the composition of the invention it is desirable to dissolve the isocyanuric acid component (which is more difficult to dissolve) first. The sulphonamide can then be added to the solution and if desired the sulphonic acid.

The components may be sold ready mixed or in a package containing a plurality of components for admixture, together with the necessary instructions as to admixture.

We claim:

1. A method of pre-treating a natural or synthetic rubber surface prior to applying an adhesive to the rubber comprising contacting said surface with a solution in an organic solvent of a halogen substituted isocyanuric acid and a non N-halogenated sulfonamide, each of said isocyanuric acid and said sulfonamide being present in said solution in an amount of from 1 - 10% wt/vol.

2. The method of claim 1 wherein said halogen substituted isocyanuric acid comprises a trichloroisocyanuric acid.

3. The method of claim 1 wherein said sulphonamide comprises paratoluenesulphonamide.

4. The method of claim 1 wherein said organic solvent comprises a compound selected from the group consisting of 111 trichloroethane, tertiary butyl alcohol, and mixtures thereof.

5. The method of claim 4 wherein said organic solvent further comprises toluene.

6. The method of claim 1 wherein said solution further comprises an aromatic sulphonic acid.

7. The method of claim 6 wherein said aromatic sulphonic acid comprises paratoluenesulphonic acid.

8. The method of claim 2 wherein said trichloroisocyanuric acid is present in said solution in an amount of 2% wt/vol. and said solution further comprises 1.5% wt/vol. paratoluensulphonic acid.

9. A method as claimed in claim 1, wherein the rubber is a thermoplastic rubber.

* * * * *